United States Patent
Bell, Jr. et al.

(10) Patent No.: US 9,298,458 B2
(45) Date of Patent: *Mar. 29, 2016

(54) PERFORMANCE OF EMERGING APPLICATIONS IN A VIRTUALIZED ENVIRONMENT USING TRANSIENT INSTRUCTION STREAMS

(75) Inventors: Robert H. Bell, Jr., Austin, TX (US); Hong L. Hua, Austin, TX (US); Ram Raghavan, Austin, TX (US); Mysore S. Srinivas, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 158 days.

This patent is subject to a terminal disclaimer.

(21) Appl. No.: 13/427,083

(22) Filed: Mar. 22, 2012

(65) Prior Publication Data

US 2012/0179873 A1 Jul. 12, 2012

Related U.S. Application Data

(63) Continuation of application No. 12/905,208, filed on Oct. 15, 2010.

(51) Int. Cl.
*G06F 9/30* (2006.01)
*G06F 9/38* (2006.01)

(52) U.S. Cl.
CPC ........ *G06F 9/30054* (2013.01); *G06F 9/30185* (2013.01); *G06F 9/3802* (2013.01)

(58) Field of Classification Search
CPC ............ G06F 9/30047; G06F 9/30054; G06F 9/30185; G06F 9/3802
USPC .......................................................... 712/220
See application file for complete search history.

(56) References Cited

U.S. PATENT DOCUMENTS

| | | | |
|---|---|---|---|
| 5,829,025 A * | 10/1998 | Mittal ........................... | 711/122 |
| 6,202,129 B1 * | 3/2001 | Palanca et al. ................ | 711/133 |
| 6,584,547 B2 * | 6/2003 | Palanca et al. ................ | 711/133 |
| 7,228,388 B2 | 6/2007 | Hu et al. | |
| 7,461,209 B2 | 12/2008 | Altman et al. | |
| 7,647,479 B2 * | 1/2010 | Henry et al. .................. | 712/213 |
| 2008/0104325 A1 | 5/2008 | Narad et al. | |

OTHER PUBLICATIONS

Vazhkudai, SS. et al.; Constructing Collaborative Desktop Storage Caches for Large Scientific Datasets, Aug. 2006.

(Continued)

*Primary Examiner* — Benjamin Geib
(74) *Attorney, Agent, or Firm* — Terrile, Cannatti, Chambers & Holland, LLP; Stephen A. Terrile (57) ABSTRACT

A method, system and computer-usable medium are disclosed for managing transient instruction streams. Transient flags are defined in Branch-and-Link (BRL) instructions that are known to be infrequently executed. A bit is likewise set in a Special Purpose Register (SPR) of the hardware (e.g., a core) that is executing an instruction request thread. Subsequent fetches or prefetches in the request thread are treated as transient and are not written to lower-level caches. If an instruction is non-transient, and if a lower-level cache is non-inclusive of the L1 instruction cache, a fetch or prefetch miss that is obtained from memory may be written in both the L1 and the lower-level cache. If it is not inclusive, a cast-out from the L1 instruction cache may be written in the lower-level cache.

6 Claims, 4 Drawing Sheets

(56) References Cited

OTHER PUBLICATIONS

Wang, NJ. et al.; Characterizing the Effects of Transient Faults on a High-Performance Processor Pipeline, 2004-2005.

Shye, A. et al.; PLR: A Software Approach to Transient Fault Tolerance for Multicore Architectures, IEEE, 2009.

Reis, GA. et al.; Configurable Transient Fault Detection via Dynamic Binary Translation, 2005-2006.

* cited by examiner

PERFORMANCE OF EMERGING APPLICATIONS IN A VIRTUALIZED ENVIRONMENT USING TRANSIENT INSTRUCTION STREAMS

BACKGROUND OF THE INVENTION

1. Field of the Invention

The present invention relates in general to the field of computers and similar technologies, and in particular to software utilized in this field. Still more particularly, it relates to an improved method and system for managing transient instruction streams.

2. Description of the Related Art

Using a cache to bridge the performance gap between a processor and main memory has become important in data processing systems, from personal computers, to work stations, to data processing systems with high performance processors. A cache memory is an auxiliary memory that provides a buffering capability through which a relatively slow main memory can interface with a processor at the processor's cycle time to optimize the performance of the data processing system. Requests are first sent to the cache to determine whether the data or instructions requested are present in the cache memory. A 'hit' occurs when the desired information is found in the cache. A 'miss' occurs when a request or access to the cache does not produce the desired information. In response to a miss, one of the cache 'lines' is replaced with a new one.

In some current software applications, the instruction footprint is large and certain instruction streams, known as transient streams, are executed infrequently. As a result, the number of processor cycles between accessing instructions in a cache line can become very large. These cache lines of instructions are typically stored in a cache hierarchy of a computer system, and are often duplicated in inclusive Level 1 (L1), Level 2 (L2), and Level 3 (L3) caches. However, these infrequently-used instructions pollute the caches. That is, they cause other, more useful data to be cast out from the cache. Likewise, they take up space in the cache until they are aged out as new data comes in. In a multi-cache hierarchy, several copies of a given cache line may pollute multiple caches. In view of the foregoing, there is a need to manage which instruction streams make use of lower-level caches and which do not, in order to increase the availability of more useful non-transient instructions and data.

SUMMARY OF THE INVENTION

A method, system and computer-usable medium are disclosed for managing transient instruction streams. In various embodiments, transient and non-transient hints, or flags, are defined for use in Branch-and-Link (BRL) and Return (RET) instructions. When a block of instructions is known to be executed only once or rarely, the transient flag in the BRL instruction is used.

When the transient flag is set, a bit is likewise set in a Special Purpose Register (SPR) of the hardware (e.g., a core) that is executing an instruction fetch or prefetch request thread. Subsequent fetches or prefetches in the fetch or prefetch request thread are treated as transient and are not written to lower-level caches. Under these conditions, if a lower-level cache is inclusive of the L1 instruction cache, a fetch or prefetch instruction miss obtained from memory is not written in the lower level caches. If it is not inclusive, a cast-out of an instruction line from the L1 cache is not written to the lower level cache. In the unusual case that the instructions have been modified, they are written to memory.

When a non-transient flag is set for the RET instruction, the bit in the SPR is reset, and subsequent instructions for that thread are treated as non-transient and are written into lower-level caches. Under these conditions, if a lower-level cache is inclusive of the L1 instruction cache, a fetch or prefetch miss that is obtained from memory is written in both the L1 and the lower-level cache. If it is not inclusive, a cast-out from the L1 instruction cache may be written in the lower-level cache.

Using these methods, the instructions in programs that are meant to be transient are treated as transient, while instructions that are not meant to be transient are not treated as transient.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A method, system and computer-usable medium are disclosed for managing transient instruction streams in a cache. As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
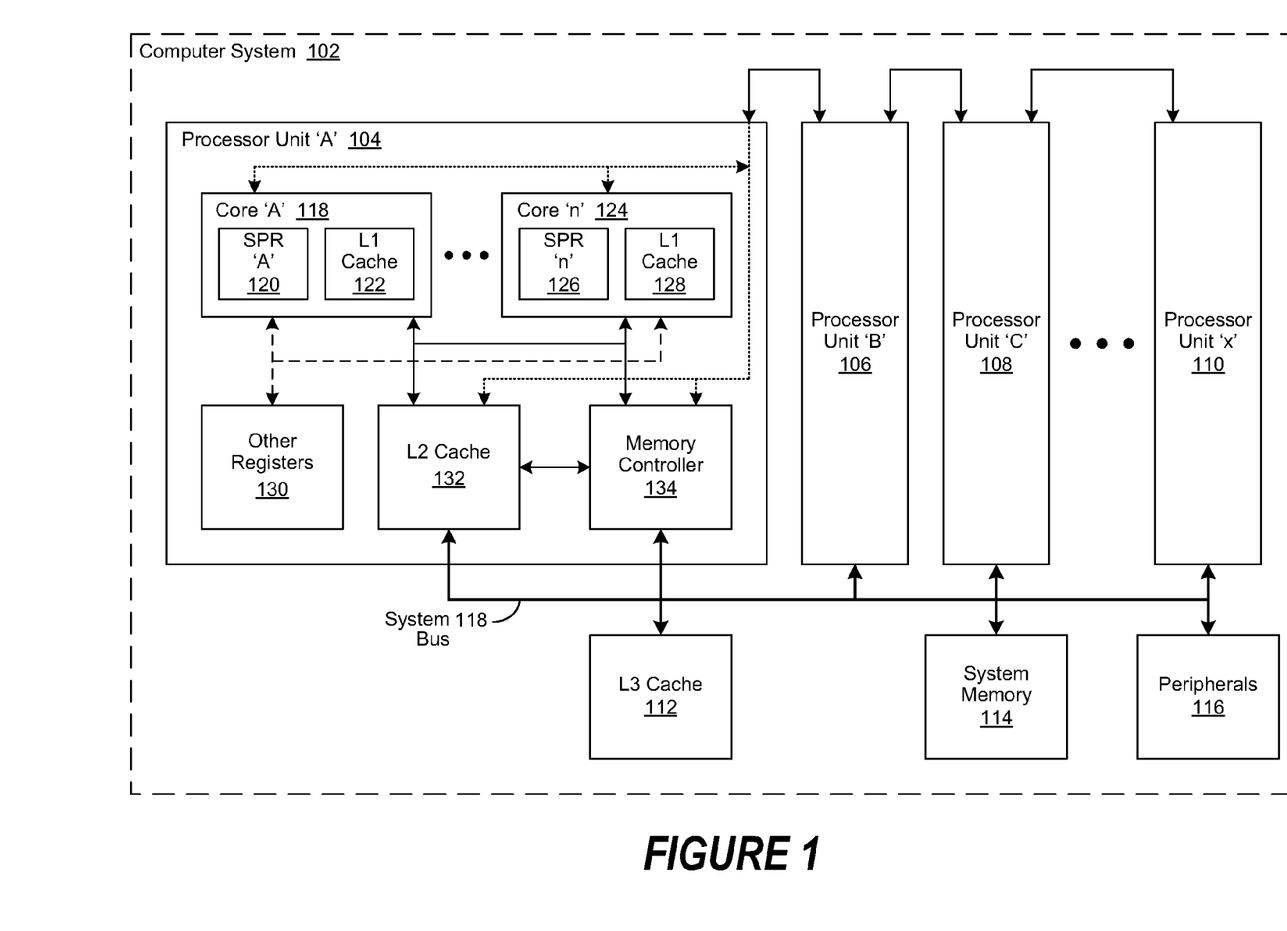
FIG. 1 depicts an exemplary client computer in which the present invention may be implemented.

FIG. 1 is a block diagram of an exemplary symmetric multi-processor computer system 102 in which the present invention may be utilized. In various embodiments, computer system 102 includes processor units 'A' 104, 'B' 106, and 'C' 108 through 'x' 110 that are coupled to a system bus 118. A Level 3 (L3) cache 112, system memory 114, and peripherals 116 are likewise coupled to system bus 118. In these and other embodiments, processor units 'A' 104, 'B' 106, and 'C' 108 through 'x' 110 communicate with each other, the Level 3 (L3) cache 112, the system memory 114, and peripherals 116 via system bus 118.

The system memory 114, comprising random access memory (RAM) stores program instructions and operand data used by the processor units 'A' 104, 'B' 106, and 'C' 108 through 'x' 110, in a volatile, or temporary, state. The peripherals 116 may be connected to the system bus 118 via a bus, such as a peripheral component interconnect (PCI) local bus, using a PCI host bridge. A PCI bridge provides a low latency path through which processor units 'A' 104, 'B' 106, and 'C' 108 through 'x' 110 may access PCI devices mapped anywhere within bus memory or input/output (I/O) address spaces. The PCI host bridge interconnecting the peripherals 116 also provides a high bandwidth path to allow the PCI devices to access the system memory 114. Such PCI devices may include a network adapter, a small computer system interface (SCSI) adapter providing interconnection to a permanent storage device (e.g., a hard disk), and an expansion bus bridge such as an industry standard architecture (ISA) expansion bus for connection to I/O devices including a keyboard, a graphics adapter connected to a display device, and a graphical pointing device (mouse) for use with the display device.

In a symmetric multi-processor (SMP) computer, the processor units 'A' 104, 'B' 106, and 'C' 108 through 'x' 110 are generally identical. That is, they all use a common set or subset of instructions and protocols to operate, and generally have the same architecture. As shown with processor unit 'A' 104, each processor unit may include one or more processor cores 'A' 118 through 'n' 124, which carry out program instructions in order to operate the computer. An exemplary processor unit includes the POWER7™ processor marketed by International Business Machines Corp., which comprises a single integrated circuit superscalar microprocessor having various execution units, registers, buffers, memories, and other functional units, which are all formed by integrated circuitry. The processor cores 'A' 118 through 'n' 124 may operate according to reduced instruction set computing (RISC) techniques, and may employ both pipelining and out-of-order execution of instructions to further improve the performance of the superscalar architecture.

Each processor core 'A' 118 through 'n' 124 respectively includes an on-board, Level 1 (L1) cache 122 through 128, which typically comprise separate instruction and data caches implemented using high speed memory devices. Caches are commonly used to temporarily store values that might be repeatedly accessed by a processor in order to speed up processing by avoiding the longer step of loading the values from the system memory 114. A processor units 'A' 104, 'B' 106, and 'C' 108 through 'x' 110 can include another cache such as a second level (L2) cache 132, which along with a memory controller 134, supports both of the L1 caches 122 through 128 that are respectively part of cores 'A' 118 through 'n' 124. Additional cache levels may be provided, such as the L3 cache 112, which is accessible via the system bus 118. Each cache level, from highest (L1) to lowest (L3) can successively store more information, but at a longer access penalty. For example, the on-board L1 caches 122 through 128 in the processor cores 'A' 118 through 'n' 124 might have a storage capacity of 128 kilobytes of memory, the L2 cache 132 might have a storage capacity of 4 megabytes, and the L3 cache 112 might have a storage capacity of 32 megabytes. To facilitate repair or replacement of defective processor unit components, each processing unit units 'A' 104, 'B' 106, and 'C' 108 through 'x' 110 may be constructed in the form of a replaceable circuit board, pluggable module, or similar field replaceable unit (FRU), which can be easily swapped, installed in, or swapped out of the computer system 102 in a modular fashion.

A cache has many memory blocks which individually store the various instructions and data values. The blocks in any cache are divided into groups of blocks called sets or congruence classes. A set is the collection of cache blocks that a given memory block can reside in. For any given memory block, there is a unique set in the cache that the block can be mapped into, according to preset mapping functions. The number of blocks in a set is referred to as the associativity of the cache. For example, a 2-way set associative means that for any given memory block there are two blocks in the cache that the memory block can be mapped into. However, several different blocks in main memory can be mapped to any given set. A 1-way set associate cache is direct mapped. That is, there is only one cache block that can contain a particular memory block. A cache is said to be fully associative if a memory block can occupy any cache block, i.e., there is one congruence class, and the address tag is the full address of the memory block.

An exemplary cache line (block) includes an address field, a state bit field, an inclusivity bit field, and a value field for storing the actual program instruction or operand data. The state bit field and inclusivity bit fields are used to maintain cache coherency in a multiprocessor computer system to indicate the validity of the value stored in the cache. The address field is a subset of the full address of the corresponding memory block. A compare match of an incoming address with one of the address fields (when the state field bits designate this line as currently valid in the cache) indicates a cache "hit." The collection of all of the address fields in a cache (and sometimes the state bit and inclusivity bit fields) is referred to as a directory, and the collection of all of the value fields is the cache entry array.

When all of the blocks in a congruence class for a given cache are full and that cache receives a request, whether a read or write operation to a memory location that maps into the full congruence class, the cache must "evict" one of the blocks currently in that class. The cache chooses a block by one of a number of means known to those skilled in the art, such as least recently used (LRU), random, pseudo-LRU, etc. to be evicted or cast out. If the data in the chosen block is modified, that data is written to the next lowest level in the memory hierarchy which may be another cache (in the case of the L2 or on-board cache) or main memory (in the case of an L3 cache, as depicted in the three-level architecture of FIG. 1). If the data in the chosen block is not modified, the block can optionally be abandoned and not written to the next lowest level in the memory hierarchy, i.e., if the next lower level is the system memory 114, the non-modified line is abandoned. If the next level in the hierarchy is another cache, the shared copy can be moved. At the end of this process, the cache no longer holds a copy of the evicted block.

The control logic for a cache memory, and in particular a cache directory, may include error correction code (ECC) circuits to handle errors that arise in a cache line. A bit in a given cache block may contain an incorrect value either due to a soft error, such as stray radiation or electrostatic discharge, or to a hard error (e.g., a defective cell). ECCs can be used to reconstruct the proper data stream. Some ECCs can only be used to detect double-bit errors and correct single-bit errors, i.e., if two bits in a particular block are invalid, then the ECC will not be able to determine what the proper data stream should actually be, but at least the failure can be detected. Other ECCs are more sophisticated and even allow detection of triple-bit errors and correction of double errors. These latter errors are costly to correct, but the design tradeoff is to halt the machine when double-bit (uncorrectable) errors occur.

These ECC circuits are one way to deal with soft errors arising in memory cells. Another approach used for dealing with hard errors is to provide redundancy within the arrays (directory, LRU, cache). When a cache chip is fabricated, it can be tested to determine if there are any defective row or column lines in each of the arrays (row and column lines are tested for the entire cache, directory, and LRU). If an array is defective, a fuse can be permanently blown to indicate its defective nature. A comparison is then made inside the array for each accessed address to see if it matches with a defective address. If so, appropriate logic re-routes the address to one of many extra row and column lines formed on the chip, i.e., from redundant bit lines (columns) and word lines (rows). The number of extra bit and word lines may vary depending upon the defect rate and desired chip yield. For a low-defect (larger physical size) cache, two extra lines might be provided for every 256 regular lines, while in a high-defect (smaller physical size) cache, two extra lines might be provided for every eight regular lines.

In various embodiments, core 'A' 118 through core 'n' 124 respectively comprise a Special Purpose Register (SPR) 'A' 120 through 'n' 126. In these and other embodiments, a bit is respectively set in SPR 'A' 120 through 'n' 126 set to indicate whether or not an instruction stream contains a transient instruction. Setting the transient instruction bit in SPR 'A' 120 through 'n' 126 results in a transient instruction line not being put into the lower-level L2 cache 132 if it is inclusive or being cast-out from an L1 instruction cache 122 through 128 into the lower-level L2 cache 132 if it is not.

The hardware elements depicted in client computer 102 are not intended to be exhaustive, but rather are representative to highlight components used by the present invention. These and other variations are intended to be within the spirit and scope of the present invention.

Figure 2:
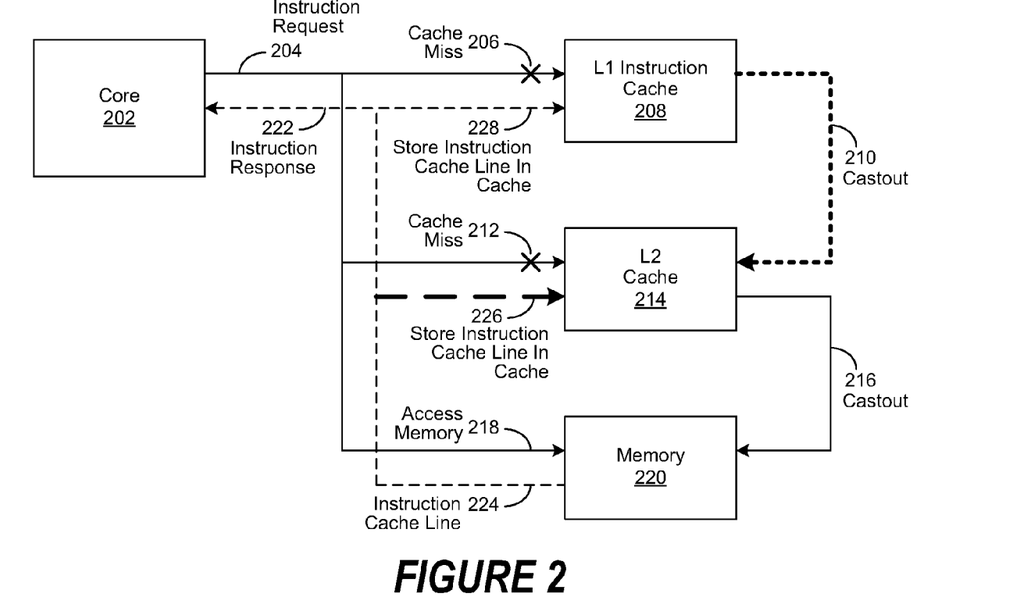
FIG. 2 shows a simplified block diagram of a Level 1 instruction cache and a Level 2 cache as implemented to process instruction streams.

FIG. 2 shows a simplified block diagram of a Level 1 instruction cache and a lower-level Level 2 cache as typically implemented to process instruction streams. In this embodiment, a core 202 issues an instruction request 204, which may be ether an instruction fetch or prefetch. The instruction request 204 misses 206 a Level 1 (L1) instruction cache 208, and subsequently misses 212 a lower-level cache, such as Level 2 (L2) cache 214. As a result, the instruction fetch or prefetch request accesses 218 memory 220, which responds 224 with the instruction cache line, which in turn is returned 222 to the core 202. When the instruction cache line is returned 224 to the core 202, it is typically also stored 228 in L1 instruction cache 208 and it may also be stored 226 in L2 cache 214 if the instruction cache line is inclusive of the L1 instruction cache. The new line in L2 cache 214 may in turn cause a cast-out 216 to memory 220. However, if the cache line is not inclusive of instruction cache L1 208, a cast-out 210 of an instruction cache line from the L1 instruction cache 208 is put into the L2 cache 214, which may in turn cause a cast-out 216 to memory 220.

In this embodiment, if the instructions in the cache line are known to be transient, in other words, never used again, the lower level caches (e.g., L2 cache 214) may be polluted with unnecessary inclusive cache lines or cast-outs. It will be appreciated by skilled practitioners of the art that these unnecessary operations can reduce system performance and increase accesses to memory 220 while also increasing system power dissipation.

Figure 3:
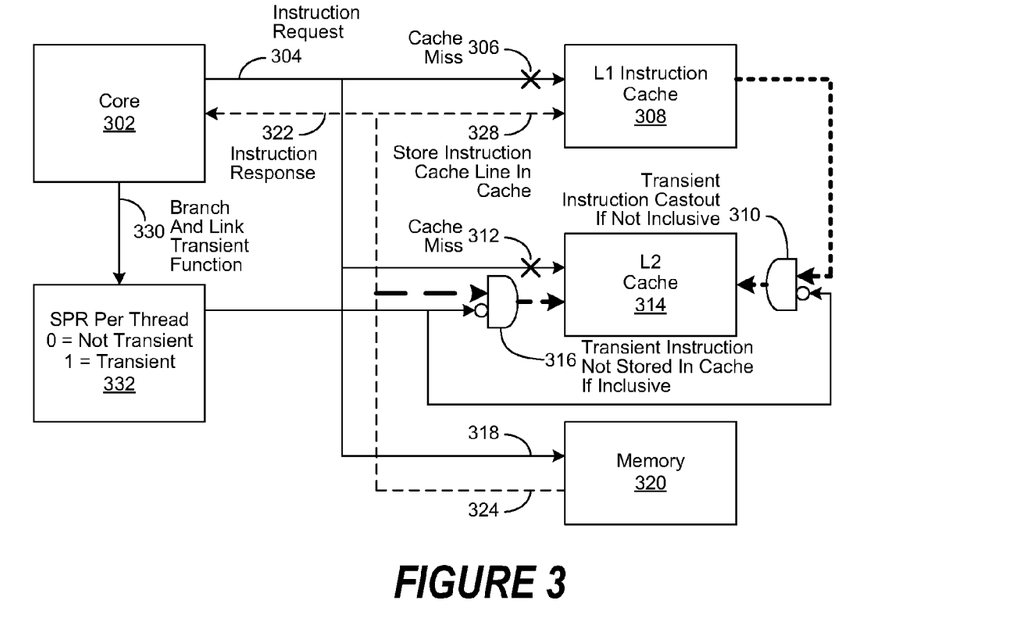
FIG. 3 shows a simplified block diagram of the operation of a Special Purpose Register as implemented to process transient instruction streams.

FIG. 3 shows a simplified block diagram of the operation of a Special Purpose Register as implemented in an embodiment of the invention to process transient instruction streams. In various embodiments, a transient hint, or flag, is inserted within compiled application code to perform a Branch-and-Link instruction. As an example:

```
#define TRANSIENT       1
#define NONTRANSIENT    0
 .
 .
ADD A, A, 1
BRL TRANSIENT START
JMP END
```

-continued

```
START:      Load X
            Load Y
            ADD X, X, Y
            RET NONTRANSIENT
END:        LOAD A
            LOAD B
            .
            .
```

In these and other embodiments, the transient and non-transient hints, or flags, are first defined for use in the Branch-and-Link (BRL) instruction and the Return (RET) instruction. When a block of instructions is known to be executed only once or rarely, the transient flag in the BRL instruction is used. When the transient flag is set, a bit is likewise set in a Special Purpose Register (SPR) of the hardware (e.g., a core) that is executing an instruction fetch or prefetch request thread. Subsequent instruction fetches or prefetches in the request thread are treated as transient and are not written to lower-level caches. Under these conditions, if a lower-level cache is inclusive of the L1 instruction cache, a fetch or prefetch instruction miss obtained from memory is not written in the lower level caches. If it is not inclusive, a cast-out of an instruction line from the L1 cache is not written to the lower level cache. In the unusual case that the instructions have been modified, they are written to memory.

When a non-transient flag is set for the RET instruction, the bit in the SPR is reset, and subsequent instructions for that thread are treated as non-transient and are written into lower-level caches. Under these conditions, if a lower-level cache is non-inclusive of the L1 instruction cache, a fetch or prefetch miss that is obtained from memory may be written in both the L1 and the lower-level cache. If it is not inclusive, a cast-out from the L1 instruction cache may be written in the lower-level cache after the instructions are obtained from memory.

As a result, the instructions in programs that are meant to be transient, and only those instructions, are treated as transient. It will be appreciated that since the instructions are treated as transient, the caches are not polluted, and other, more valuable data and instructions will be maintained in the caches, thereby improving performance.

Referring now to FIG. 3, in this embodiment, a Special Purpose Register (SPR) 332 is set when a Branch-and-Link instruction 330 containing a Transient hint is executed for an instruction request thread 304. When a core 302 issues an instruction request 304 thread, which may be ether an instruction fetch or prefetch, it may miss a Level 1 (L1) instruction cache 308, and then subsequently miss 312 a lower-level cache, such as Level 2 (L2) cache 314.

If the instruction request 304 thread misses both the L1 instruction cache 308 and the L2 cache 314, then the instruction request is submitted to memory 320. The instruction response 322 is then sourced 324 from memory 320 and is written 328 to the L1 instruction cache 308. However, logic is implemented using the SPR bit 332 such that the transient instruction line is not put into the lower-level L2 cache 314 if it is inclusive 316 and such that transient instruction lines are not cast-out into the lower-level L2 cache 314 if it is not 310. In the unusual case that instruction lines have been modified, they may be written back from L1 cache 308 to memory 320. As a result of these methods, unnecessary cast-outs from the lower-level L2 cache 314 to memory 320 are avoided, which can improve performance and result in lower power dissipation in the cache and memory hierarchy.

Figure 4A:
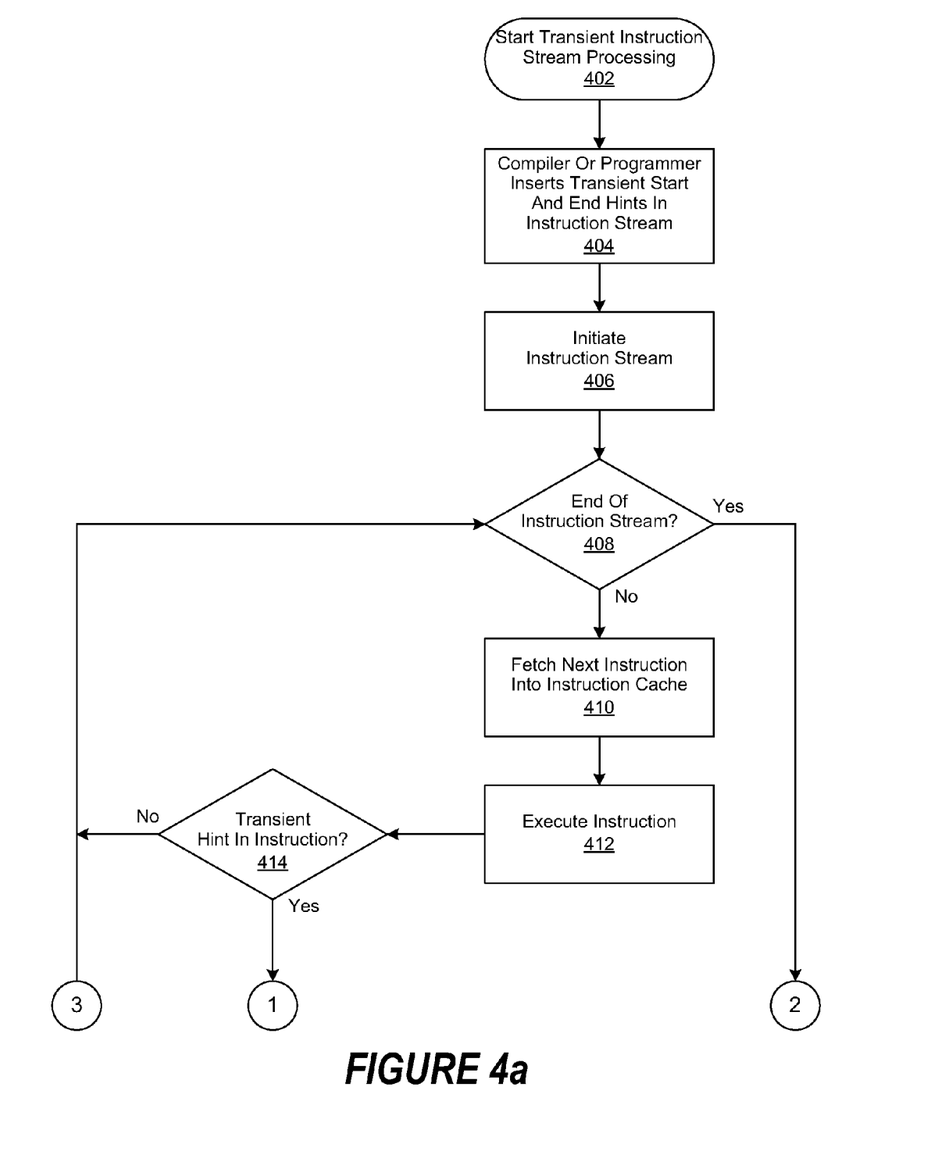
FIGS. 4A and 4B show a generalized flowchart of the operation of a Special Purpose Register as implemented to process transient instruction streams.
Figure 4B:
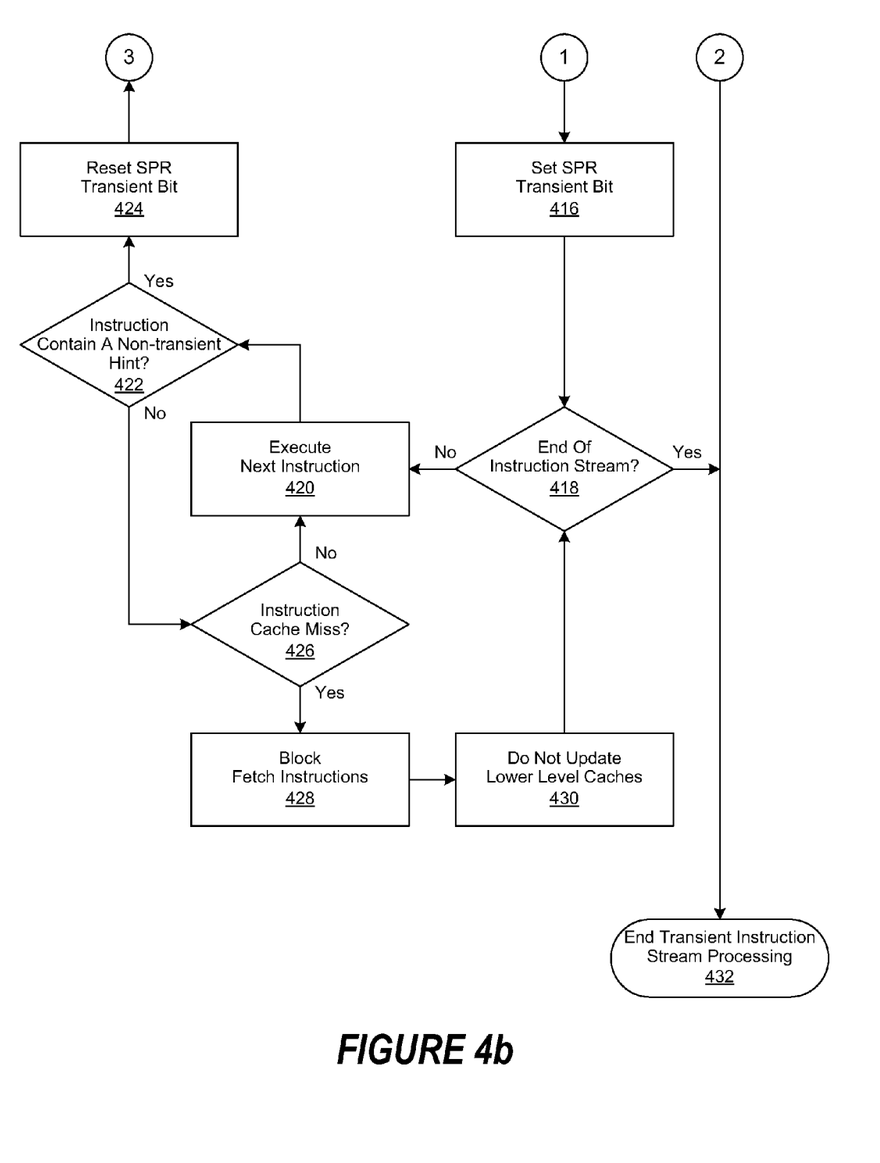

FIG. 4 is a generalized flowchart of the operation of a Special Purpose Register as implemented in an embodiment of the invention to process transient instruction streams. In this embodiment, transient instruction request stream processing is begun in step 402, followed by a compiler or human programmer inserting transient start and end hints, or flags, in the instruction request stream in step 404. The instruction request stream is then initiated in step 406 followed by a determination being made in step 408 whether the end of the instruction stream has been met. If so, then transient instruction request stream processing is ended in step 432. Otherwise, the next instruction is fetched into an instruction cache in step 410 and the instruction is then executed in step 412.

A determination is then made in step 414 whether a transient hint, or flag, is present in the instruction. If not, then the process is continued, proceeding with step 408. Otherwise, as described in greater detail herein, a transient bit is set in a special purpose register (SPR) in step 416. Thereafter, a determination is made in step 418 whether the end of the instruction stream has been met. If so, then transient instruction request stream processing is ended in step 432. Otherwise, the next instruction is executed in step 420, followed by a determination being made in step 422 whether the instruction contains a non-transient hint. If so, then as described in greater detail herein, the SPR bit is reset in step 424. The process is then continued, proceeding with step 408.

However, if it is determined in step 422 that the instruction does not contain a non-transient hint, then a determination is made in step 426 whether an instruction cache miss occurred. If not, then the process is continued, proceeding with step 420. Otherwise, fetch instructions are blocked in step 428 and, as described in greater detail herein, the lower level caches are not updated in step 430. The process is then continued, proceeding with step 418.

Although the present invention has been described in detail, it should be understood that various changes, substitutions and alterations can be made hereto without departing from the spirit and scope of the invention as defined by the appended claims.

What is claimed is:

1. A computer-implemented method for managing transient instruction streams, comprising:
    inserting a transient hint into an instruction request stream to indicate a transient instruction, the transient instruction comprising an infrequently executed instruction, the infrequently executed instruction corresponding to an instruction in which a number of processor cycles between accessing the instruction would cause the instruction to pollute a cache;
    inserting a non-transient hint into the instruction request stream to indicate a non-transient instruction;
    processing the instruction request stream to identify the transient instruction;
    setting a transient instruction bit in a Special Purpose Register (SPR) when the transient instruction is identified;
    storing the transient instruction in a high-level cache;
    processing the transient instruction, wherein the transient instruction is not stored in a lower-level cache;
    resetting the transient instruction bit when a non-transient hint is detected; and,
    processing a non-transient instruction based upon transient instruction bit being reset, the processing including storing the non-transient instruction in the lower-level cache.

2. The method of claim 1, wherein the transient hint is inserted in a Branch-and-Link (BRL) instruction.

3. The method of claim 1, wherein a non-transient hint is inserted into a Return (RET) instruction.

4. The method of claim 3, wherein the transient bit in the SPR is reset when the RET instruction containing the non-transient hint is processed.

5. The method of claim 4, wherein subsequent instructions are processed as non-transient instructions and are written to the lower-level cache after the transient bit is reset.

6. The method of claim 1, wherein subsequent instructions are processed as non-transient instructions and are written to the lower-level cache after the transient bit is reset.

* * * * *